(12) United States Patent
Bae et al.

(10) Patent No.: US 10,295,433 B2
(45) Date of Patent: May 21, 2019

(54) DEVICE FOR TESTING PERFORMANCE OF PYRO DEVICE USING HIGH-PRESSURE AIR

(71) Applicants: Sangho Bae, Seoul (KR); Byungtae Ryu, Sejong-si (KR); Hongbeen Chang, Daejeon (KR); Zaeill Kim, Sejong-si (KR)

(72) Inventors: Sangho Bae, Seoul (KR); Byungtae Ryu, Sejong-si (KR); Hongbeen Chang, Daejeon (KR); Zaeill Kim, Sejong-si (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 164 days.

(21) Appl. No.: 15/415,237

(22) Filed: Jan. 25, 2017

(65) Prior Publication Data

US 2018/0087995 A1    Mar. 29, 2018

(30) Foreign Application Priority Data

Sep. 27, 2016    (KR) .......................... 10-2016-0124094

(51) Int. Cl.
*F04B 27/12*        (2006.01)
*F04B 37/12*        (2006.01)
(Continued)

(52) U.S. Cl.
CPC ............. *G01M 3/26* (2013.01); *F04B 27/005* (2013.01); *F04B 37/10* (2013.01)

(58) Field of Classification Search
CPC . G01M 3/00; G01M 3/26; G01M 3/32; F04B 27/00; F04B 27/005; F04B 27/12; F04B 37/10; F04B 37/12
See application file for complete search history.

(56) References Cited

U.S. PATENT DOCUMENTS

| 2,463,552 A | * | 3/1949 | Newhall ................... F15B 3/00 |
|---|---|---|---|
| | | | 417/345 |
| 3,234,882 A | * | 2/1966 | Douglas .................. F01L 25/08 |
| | | | 417/307 |

(Continued)

FOREIGN PATENT DOCUMENTS

| JP | 2922225 B2 | 7/1999 | |
|---|---|---|---|
| JP | 2001059501 A | * 3/2001 | ................ F15B 3/00 |

(Continued)

*Primary Examiner* — Nguyen Q. Ha
(74) *Attorney, Agent, or Firm* — Scully Scott Murphy and Presser

(57) ABSTRACT

Provided is a performance testing device including: a compressor configured to generate compressed air; an air storage tank configured to receive the compressed air generated by the compressor; a regulator connected to each of the compressor and the air storage tank to control a pressure of the compressed air; a main supply line connected to the regulator to move the compressed air; an input port line and an output port line connected to the main supply line to receive the compressed air from the air storage tank and deliver the compressed air to an input port or an output port of a test object; and a pneumatic booster configured to pressurize the compressed air received in the input port line or the output port line, wherein in order to test a performance of the test object, the pressurized compressed air is applied to the input port or the output port of the test object.

14 Claims, 4 Drawing Sheets

(51) Int. Cl.
   *G01M 3/26*      (2006.01)
   *F04B 27/00*     (2006.01)
   *F04B 37/10*     (2006.01)

(56) References Cited

U.S. PATENT DOCUMENTS

| | | | | |
|---|---|---|---|---|
| 5,863,186 | A * | 1/1999 | Green | F04B 9/113 |
| | | | | 417/244 |
| 6,558,134 | B2 * | 5/2003 | Serafin | F04B 9/1176 |
| | | | | 417/244 |
| 6,663,089 | B2 * | 12/2003 | Kitaura | F16F 9/06 |
| | | | | 267/119 |
| 2015/0166029 | A1 * | 6/2015 | Yamasaki | B60T 8/4081 |
| | | | | 303/14 |
| 2015/0345490 | A1 | 12/2015 | Bremeier et al. | |
| 2015/0359579 | A1 * | 12/2015 | Sasaki | A61B 17/8822 |
| | | | | 606/94 |

FOREIGN PATENT DOCUMENTS

| | | |
|---|---|---|
| KR | 100446329 B1 | 9/2004 |
| KR | 1020090132595 A | 12/2009 |
| KR | 1020100000774 A | 1/2010 |
| KR | 102015-0094749 A | 8/2015 |
| KR | 102015-0111066 A | 10/2015 |

* cited by examiner

DEVICE FOR TESTING PERFORMANCE OF PYRO DEVICE USING HIGH-PRESSURE AIR

CROSS-REFERENCE TO RELATED APPLICATION

Pursuant to 35 U.S.C. § 119(a), this application claims the benefit of earlier filing date and right of priority to Korean Application No. 10-2016-0124094, filed on Sep. 27, 2016, the contents of which is incorporated by reference herein in its entirety.

BACKGROUND OF THE INVENTION

1. Field of the Invention

The present invention relates to a device for testing the performance and reliability of a pyro device.

2. Background of the Invention

Generally, a pyro device is a device for converting high-temperature and high-pressure gas, generated by burning of a gunpowder inside a pressure cartridge, into kinetic energy such as a piston motion.

Examples of a pyro device include a pyro valve, a pyro separation device, and a pyro pusher, and the pyro device is widely used in the field of guided weapons and aerospace because it has a fast response speed and is manufactured with a light and simple structure.

Since the pyro device requires high operating reliability at high pressures, reliability evaluation through repetitive testing is essential. Airtight inspection under high pressures is necessary in order to verify the performance and reliability of a pyro device that performs mechanical functions using high-pressure gas. A test equipment for performing such a performance test includes a pneumatic generating system for generating pneumatic pressure and a conventional pneumatic generating system has a problem that the size of a pneumatic pressure is limited to the performance of a compressor and an air tank.

Additionally, in order to evaluate the reliability of a pyro device, it is required to use high-performance and high-priced equipment in order to generate high-pressure compressed air. Since the reliability evaluation of a pyro device is performed with only a small amount of compressed air without consuming almost any compressed air by utilizing static pressure, it is inefficient to operate expensive and high-end compressors and air storage tanks.

Therefore, there is a need for a device having a relatively simple structure to perform the airtightness inspection of a pyro device (i.e., a test object) thereby testing the reliability of the test object economically.

SUMMARY OF THE INVENTION

Therefore, an aspect of the detailed description is to provide a structure of a performance testing device that applies a high pressure to a test object in order to verify the operation performance of the test object.

Another aspect of the detailed description is to provide a structure of a performance testing device that generates a relatively high pressure from a low pressure to apply it to a test object.

Another aspect of the detailed description is to provide a structure of a performance testing device that applies a high pressure to a test object through a valve control.

Another aspect of the detailed description is to provide a structure of a test device for testing a plurality of test objects repetitively in order to evaluate the reliability of the test object.

To achieve these and other advantages and in accordance with the purpose of this specification, as embodied and broadly described herein, there is provided a performance testing device including: a compressor configured to generate compressed air; an air storage tank configured to receive the compressed air generated by the compressor; a regulator connected to the compressor and the air storage tank to control a pressure of the compressed air; a main supply line connected to the regulator to receive the compressed air from the air storage tank and to move the compressed air; an input port line and an output port line connected to the main supply line to receive the compressed air from the air tank and to deliver the compressed air to an input port or an output port of a test object; and a pneumatic booster configured to pressurize the compressed air received in the input port line or the output port line, wherein in order to test a performance of the test object, the pressurized compressed air is applied to the input port or the output port.

The pneumatic booster may include: a first pneumatic booster configured to pressurize the compressed air received in the input port line; and a second pneumatic booster configured to pressurize the compressed air received in the output port line.

The first pneumatic booster and the second pneumatic booster may be formed in plurality.

The performance testing device may further include: a charging line connected to each of the input port line and the output port line to deliver the compressed air to from the air storage tank the pneumatic boosters; and a boosting line connected to the main supply line and one end of the pneumatic boosters to deliver the compressed air from the air storage tank to the pneumatic boosters.

The charging line may include: a first charging line configured to connect the input port line and another end of the first pneumatic booster to deliver the compressed air from the air storage tank to the first pneumatic booster; and a second charging line configured to connect the output port line and another end of the second pneumatic booster to deliver the compressed air from the air storage tank to the second pneumatic booster.

The boosting line may include: a first boosting line configured to connect the main supply line and one end of the first pneumatic booster to deliver the compressed air from the air storage tank to the first pneumatic booster; and a second boosting line configured to connect the main supply line and one end of the second pneumatic booster to deliver the compressed air from the air storage tank to the second pneumatic booster.

The performance testing device may further include a valve installed at each one side of the main supply line, the input port line, the output port line, the charging line, and the boosting line to control a flow of the compressed air.

The performance testing device may further include a control unit configured to control an opening/closing of the valve.

A pressure sensor is provided on the input port line and the output port line for measuring a pressure formed at the input port and the output port of the test object. The performance testing device may further include a measurement device configured to detect a signal according to a pressure measured by the pressure sensor.

The performance testing device may further include a detonation device connected to the test object to ignite the test object.

Each of the pneumatic boosters may include: a cylinder configured to form an enclosed to receive the compressed air in an internal space of the enclosure; a piston configured to reciprocate in the internal space to pressurize the compressed air; and a cover configured to cover each end of the cylinder, wherein one end of the cylinder may be connected to the charging line and the other end may be connected to the boosting line so that the compressed air from the air storage tank flows from the boosting line to the internal space through movement of the piston.

The piston include an o-ring configured to maintain an airtightness of compressed air that flows from the boosting line to the internal space.

A compressed air discharge hole for discharging air in a space between the piston and the cylinder to the outside may be formed at one side of the cylinder.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
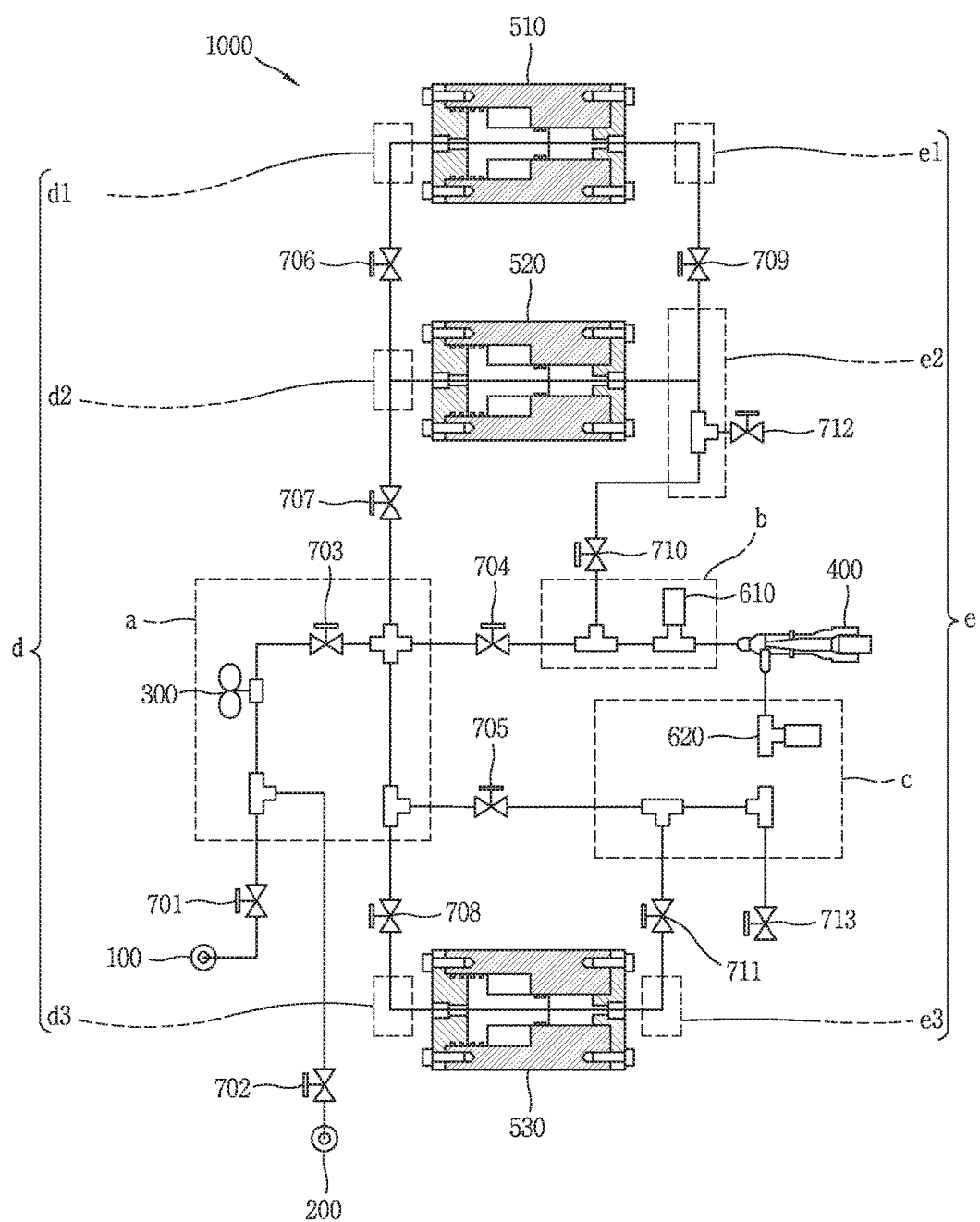
FIG. 1 is a conceptual diagram illustrating a configuration of a performance testing device.

Description will now be given in detail of preferred configurations of devices for testing the performance of a pyro device according to the present invention, with reference to the accompanying drawings.

In this specification, even in different embodiments, like reference numerals refer to like elements and the description thereof is replaced with the first description. The singular expressions include the plural expressions unless the context clearly dictates otherwise.

A device for testing the performance of a pyro device (hereinafter referred to as a performance testing device 1000 in this specification) is device for testing the performance and reliability of pyro device by applying a generated high-pressure compressed air to the pyro device in this specification, the performance testing device 1000 is intended for a pyro device, and the pyro device has the same meaning as a test object 400.

FIG. 1 is a conceptual diagram illustrating a configuration of the performance testing device 1000.

The performance testing device 1000 includes a compressor 100, an air storage tank 200, a regulator 300, a main supply line a, an input port line b, an output port line c, and pneumatic boosters 510, 520, and 530.

The compressor 100 refers to a machine for compressing air or other gases to increase the pressure thereof. The compressor 100 generates compressed air and stores the generated compressed air in the air storage tank 200. Since the performance test on a pyro device may be performed with only a small amount of compressed air by utilizing static pressure, the capacity of the air storage tank 200 where the compressed air generated from the compressor 100 is received may be selected variously. The air storage tank 200 has the shape of a container where compressed air is stored.

The regulator 300 may adjust the pressure of the compressed air delivered to the main supply line a as serving to adjust the pressure of compressed air. The regulator 300 is connected to each of the compressor 100 and the air storage tank 200 to control the pressure of compressed air. As shown in FIG. 1, the main supply line a, the input port line b, the output port line c, boosting lines d1, d2, and d3, and charging lines e1, e2, and e3 serve as a pipe of compressed air for delivering compressed air to a test object 400 (referred to as a pyro device in this specification) as serving to form a flow passage of air The main supply line a is connected to the regulator 300 to serve to move the compressed air received in the air storage tank 200. The main supply line a moves compressed air in the direction of the test object 400.

The input port line b serves to deliver compressed air to an input port formed at one end of the test object 400. The input port line b is connected to the main supply line a and delivers compressed air to an input port (not shown) formed at the test object 400.

Alternatively, the output port line c serves to deliver compressed air to an output port formed at the other end of the test object 400. The output port line c is connected to the main supply line a and delivers compressed air to an output port (not shown) formed at the test object 400.

Through the input port line b and the output port line c, compressed air may be applied to one of the both ends of the test object 400, so that it is possible to perform the performance test on the test object 400 when high-pressure compressed air is applied.

The pneumatic boosters 510, 520, and 530 are devices for pressurizing compressed air received in the input port line b or the output port line c to a higher pressure. The charging lines e1, e2, and e3 and the boosting lines d1, d2, and d3 are connected to the pneumatic boosters 510, 520, and 530 to pressurize the compressed air flowing through the charging lines e1, e2, and e3 so that high-pressure compressed air may be applied to the test object 400 through the input port line b or the output port line c.

The pneumatic boosters 510, 520, and 530 include first pneumatic boosters 510 and 520 and a second pneumatic booster 530.

The first pneumatic boosters 510 and 520 further compress the compressed air received from the main supply in the input port line b to increase the pneumatic pressure and the second pneumatic booster 530 further compresses the compressed air received from the main supply a in the output port line c to increase the pneumatic pressure.

Figure 2:
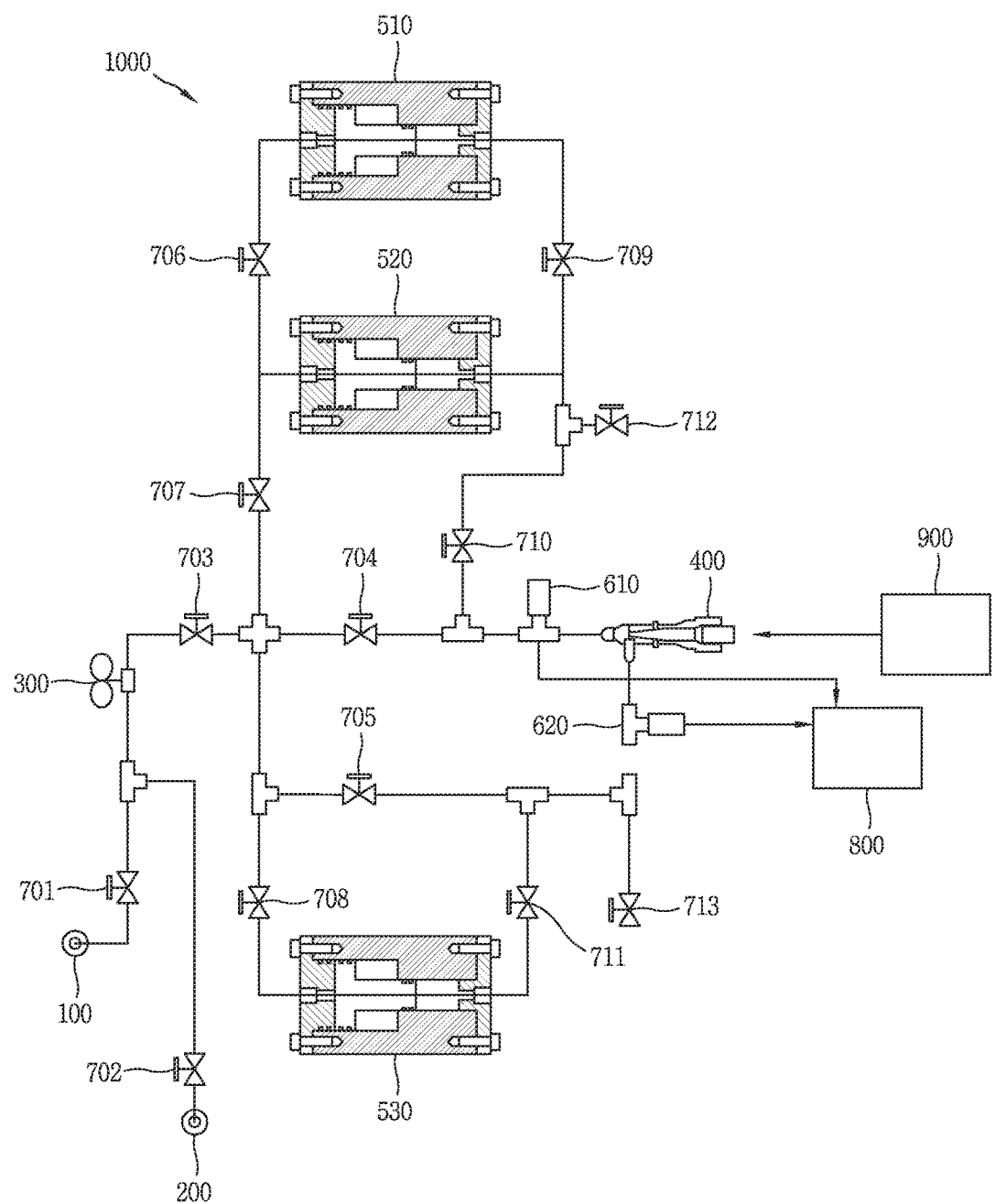
FIG. 2 is a conceptual diagram illustrating a performance testing device according to another embodiment of the present invention.
Figure 3:
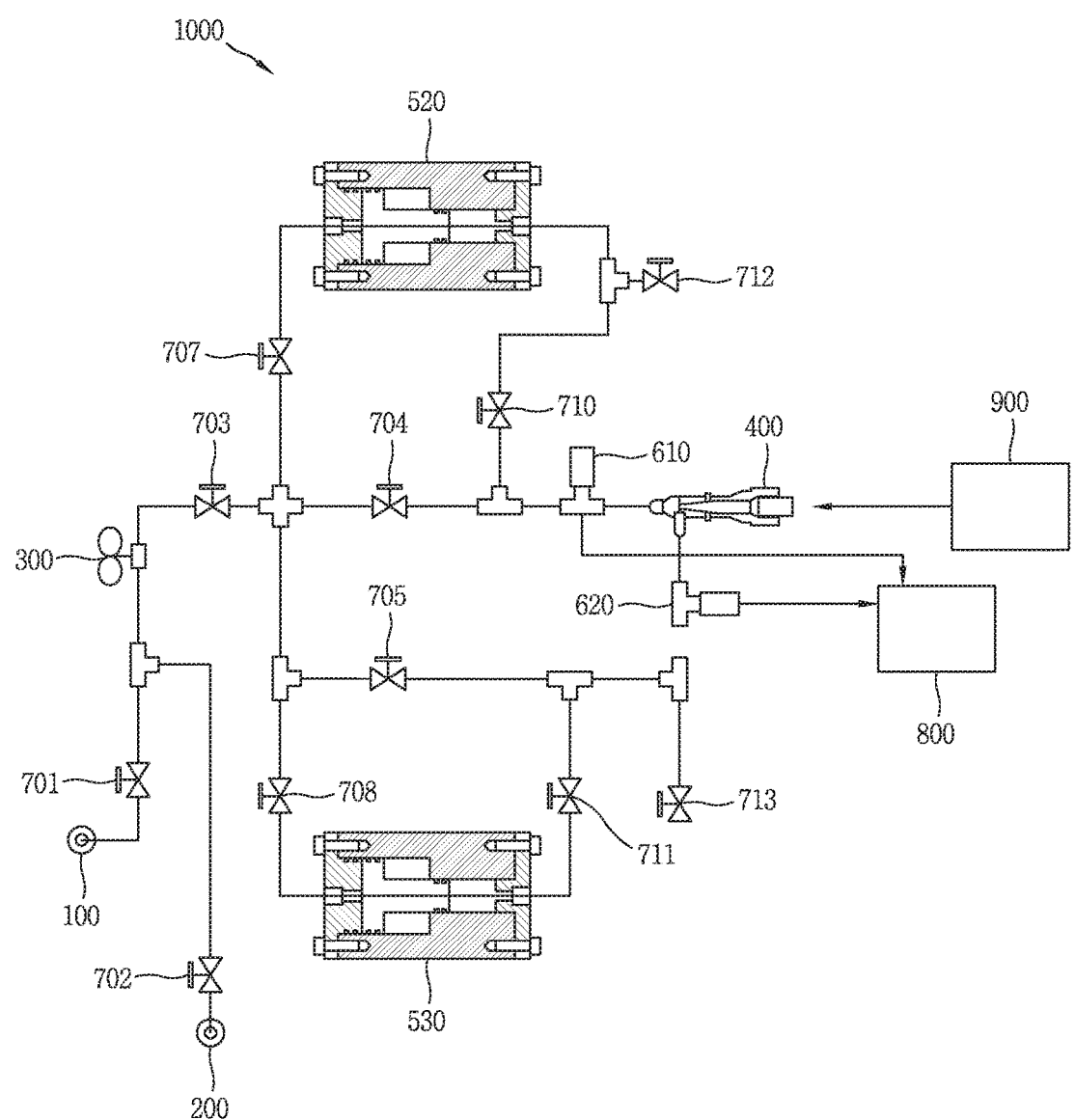
FIG. 3 is a conceptual diagram illustrating a performance testing device according to another embodiment of the present invention.

As shown in FIG. 1, the first pneumatic boosters 510 and 520 may be installed in plurality in order to further increase the pressure of the compressed air received in the input port line b. Although FIG. 1 illustrates that two first pneumatic boosters 510 and 520 are installed vertically, this is just one example. As shown in FIG. 3, only one of the first pneumatic boosters 510 and 520 may be installed or as shown in FIG. 2, two or more first pneumatic boosters 510 and 520 may be installed.

In the same manner, the second pneumatic booster 530 may be configured in plurality in order to further increase the pressure of the compressed air received in the output port line c. Although it is shown in FIG. 1 that one second pneumatic booster 530 is installed, in consideration of a setting pressure to be applied to the test object 400, a device user may install several second pneumatic boosters 530.

When each of the first pneumatic boosters 510 and 520 and the second pneumatic booster 530 is provided in plurality, the charging lines e1, e2, and e3 and the boosting lines d1, d2, and d3 disposed at the both ends of the pneumatic boosters are required to be disposed according thereto.

The specific internal structure of the pneumatic booster and its working principle will be discussed separately below.

The charging lines e1, e2, and e3 and the boosting lines d1, d2, and d3 are respectively connected to the both ends of the pneumatic booster. The charging lines e1, e2, and e3 include first charging lines e1 and e2 and a second charging line e3.

The first charging lines e1 and e2 are connected to the input port line b to serve to deliver compressed air from the air storage tank 200 to the first pneumatic boosters 510 and 520. The compressed air is received in the first pneumatic boosters 510 and 520 to be further compressed by operations of the first pneumatic boosters 510 and 520.

The second charging line e3 is connected to the output port line c to serve to deliver compressed air from the air storage tank 200 to the second pneumatic booster 530. The compressed air is received in the second pneumatic booster 530 to be further compressed by an operation of the second pneumatic booster 530.

The boosting lines d1, d2, and d3 are respectively connected to one ends of the main supply line a, the first pneumatic boosters 510 and 520, and the second pneumatic booster 530. The boosting lines d1, d2, and d3 deliver compressed air from the air storage tank 200 to the first pneumatic boosters 510 and 520 and the second pneumatic booster 530 to further compress the compressed air already received in the pneumatic boosters by means of a piston 503.

The boosting lines d1, d2, and d3 include first boosting lines d1 and d2 and a second boosting line d3.

The first boosting lines d1 and d2 connect the main supply line a and one ends of the first pneumatic boosters 510 and 520 in order to serve to deliver compressed air to the first pneumatic boosters 510 and 520.

The second boosting line d3 connects the main supply line a and one end of the second pneumatic booster 530 in order to serve to deliver compressed air to the second pneumatic booster 530.

The performance testing device 1000 includes valves 701 to 713 for controlling the flow of compressed air.

As shown in FIG. 1, the valves 701 to 713 are used to control the compressor 100 and the air storage tank 200 and are installed at one sides of the main supply line a, the input port line b, the output port line c, the boosting lines d1, d2, and d3, and the charging lines e1, e2, and e3, where compressed air flows, in order to open/close the flow of air.

The valves 701 to 713 include a compressor valve 701, an air storage tank valve 702, a main valve 703, an input port valve 704, an output port valve 705, boosting valves 706, 707, and 708, charging valves 709, 710, and 711, and vent valves 712 and 713.

Each of the valves 701 to 713 may be opened or closed by a control unit (not shown) in order to generate and apply pressurized compressed air to one end of the test object 400. The control unit (not shown) may allow the pressurized compressed air to be generated and applied to the test object 400 through a method of opening or closing each of the valves 701 and 713 sequentially or simultaneously.

A valve serves to open or close a flow passage in order to control the flow or air. A valve may have a general valve structure installable at a flow passage and mean a check valve allowing a flow passage formation in one direction.

The compressor valve 701 is installed adjacent to the compressor 100 in order to serve to control the air flow between the main supply line a and the compressor 100. The compressor valve 701 may control the flow of the compressed air generated by the compressor 100.

The air storage tank valve 702 is installed adjacent to the air storage tank 200 in order to serve to control the air flow between the main supply line a and the air storage tank 200. The air storage tank valve 702 is opened to allow the compressed air generated by the compressor 100 to be received in the air storage tank 200 or the received compressed air to flow from the air storage tank 200 to the main supply line a.

The main valve 703 is installed at one side of the main supply line a to control the flow of the compressed air flowing through the main supply line a. When the main valve 703 is opened, compressed air may flow toward the input port line b and the output port line c, which are connected to the main supply line a.

The input port valve 704 serves to move compressed air to an input port of the test object 400 or limit this. That is, the input port valve 704 is installed between the main supply line a and the input port line b in order to control the flow of the compressed air flowing from the main supply line a toward the input port line b.

The output port valve 705 serves to move compressed air to an output port of the test object 400 or limit this. The output port valve 705 is installed between the main supply line a and the output port line c in order to control the flow of the compressed air flowing from the main supply line a toward the output port line c.

The boosting valves 706, 707, and 708 serve to control the flow of compressed air in the boosting lines d1, d2, and d3. The boosting valves 706, 707, and 708 are installed at one sides of the boosting lines d1, d2, and d3 to control the supply of compressed air to input parts 505 at one ends of the pneumatic boosters 510, 520, and 530.

The charging valves 709, 710, and 711 serve to control the flow of compressed air in the charging lines e1, e2, and e3. The charging valves 709, 710, and 711 are installed at one sides of the charging lines e1, e2, and e3 to control the supply of compressed air to and from charging parts 504 of the pneumatic boosters 510, 520, and 530.

The vent valves 712 and 713 serve to discharge the internal compressed air of the performance testing device 1000 to the outside. Through the vent valves 712 and 713, it is possible to discharge compressed air to the air. The vent valves 712 and 713 are installed at one side of the output port line c and one side of the input port line b.

The performance testing device 1000 may includes pressure sensors 610 and 620 for measuring pressure.

The pressure sensors 610 and 620 include an input port pressure sensor 610 for measuring the pressure of the input port line b and an output port pressure sensor 620 for measuring the pressure of the output port line c.

The input port pressure sensor 610 is installed at one side of the input port line b and serves to measure the pressure formed at the input port of the test object 400. The output port pressure sensor 620 is installed at one side of the output port line c and serves to measure the pressure formed at the output port of the test object 400.

For example, in order to observe the airtight state of the test object 400 according to atmospheric pressure, the pressure sensors 610 and 620 adjust the zero points thereof while closing only the main valve 703 and opening the vent valves 712 and 713, the compressor valve 701, the air storage tank valve 702, the input port valve 704, the output port valve 705, the boosting valves 706, 707, and 708, and the charging valves 709, 710, and 711. After adjusting the zero points, it is possible to check the airtight state of the test object 400 by observing a pneumatic pressure change amount in an input port and an output port, which is measured by each of the pressure sensors 610 and 620 and a measurement device 800.

FIG. 2 is a conceptual diagram illustrating the performance testing device 1000 according to another embodiment of the present invention.

As noted above, the performance testing device 1000 includes the compressor 100, the air storage tank 200, the regulator 300, the main supply line a, the input port line b, the output port line c, and the pneumatic boosters 510, 520, and 530. Additionally, in order to control the flow of compressed air, each of the valves 701 to 713 is installed and a control unit (not shown) is included as a component to control each of the valves 701 to 713. These components are the same as those described above and their descriptions are omitted.

As shown in FIG. 2, the performance testing device 1000 may further include the measurement device 800.

The measurement device 800 is electrically connected to each of the pressure sensors 610 and 620.

The pressure formed at the input port of the test object 400 by the input port pressure sensor 610 and the pressure formed at the output port of the test object 400 by the output port pressure sensor 620 may be measured by the measurement device 800. Additionally, by the measurement device 800, the pressures formed at the input port and the output port of the test object 400 may be measured in real time and provided to a device user through a display unit (not shown) installed at the measurement device 800.

The performance testing device 1000 may further includes a detonation device 900 for detonating the test object 400. The detonation device 900 serves to ignite the test object 400 and then, measures an airtight maintenance state before/after an operation of the test object 400 according to the ignition.

FIG. 3 is a conceptual diagram illustrating the performance testing device 1000 according to another embodiment of the present invention.

As noted above, the pneumatic boosters 510, 520, and 530 may include the first pneumatic boosters 510 and 520 and the second pneumatic booster 530. However, as shown in FIG. 3, it is possible to install only one first pneumatic booster 520.

The first pneumatic booster 520 further compresses the compressed air received in the input port line b to increase the pneumatic pressure and the second pneumatic booster 530 further compresses the compressed air received in the output port line c to increase the pneumatic pressure. This is the same as described above.

The first pneumatic booster 520 and the second pneumatic booster 530 serve to increase the pressure of compressed air and when a plurality of them are combined, it is possible to further increase the pressure of compressed air.

As shown in FIG. 3, in relation to the performance testing device 1000, it is possible to install only each one of the first pneumatic booster 520 and the second pneumatic booster 530 and if a device user wants to further increases the pressure of compressed air, as shown in FIGS. 1 and 2, it is possible to configure the first pneumatic booster 520 in plurality. Additionally, although not shown in the drawing, it is possible to configure the second pneumatic booster 530 to be installed in plurality in order to further increase the pressure of the compressed air received in the output port line c. However, when the first pneumatic booster 520 and the second pneumatic booster 530 are installed in plurality, the charging lines e1, e2, and e3 and the boosting lines d1, d2, and d3 disposed at the both ends of each pneumatic booster are required to be disposed according thereto.

According to the present invention, as a device for testing the performance by applying a high pressure to the test object 400, the performance testing device 1000 may further include a control unit (not shown) for controlling each valve.

When looking into the process for increasing the pressure of the compressed air in the input port line b through a control of each of the valves 701 to 713 according to FIGS. 1 to 3, the process first closes the main valve 703 and opens each of the valves (that is, the compressor valve 701, the air storage tank valve 702, the input port valve 704, the output port valve 705, the boosting valves 706, 707, and 708, and the charging valves 709, 710, and 711) to charge compressed air in the air storage tank 200 by using the compressor 100. When the compressed air is charged in the air storage tank 200, the process closes the compressor valve 701 and adjusts the pressure of air through the regulator 300. Then, except for the valve 702 of the air storage tank 200, after closing the remaining valves (that is, the compressor valve 701, the main valve 703, the input port valve 704, the output port valve 705, the boosting valves 706, 707, and 708, and charging valves 709, 710, and 711), the process opens the main valve 703. Then, in order to supply compressed air to the input port of the test object 400, the process opens the input port valve 704 to allow compressed air to flow along the input port line b.

Additionally, through the first pneumatic boosters 510 and 520, the compressed air having a larger pressure may be supplied to the input port of the test object 400.

After allowing compressed air to be received in the charging parts 504 of the first pneumatic boosters 510 and 520 by opening the charging valves 709, 710, and 711, compressed air from the air storage tank 200 flows into the input parts 505 of the first pneumatic boosters 510 and 520 by opening the boosting valves 706, 707, and 708 in order to operate the first pneumatic boosters 510 and 520. The compressed air received in the input parts 505 of the first pneumatic boosters 510 and 520 forms the movement of the piston 503 as the compressed air flows toward the output parts of the first pneumatic boosters 510 and 520, and pressurizes the received compressed air in the output parts 504. In this case, the air pressure of the compressed air received in the charging lines e1, e2, and e3 and the input port line b is increased. The compressed air having the increased pressure is applied to the input port of the test object 400.

In the same manner, when looking into the process for increasing the pressure of the compressed air in the output port line c, the process for allowing the compressed air received in the air storage tank 200 to flow along the input port line b by opening the main valve 703 is the same as described above.

However, there is a difference in the process for supplying the compressed air having a larger pressure to the output port of the test object 400 through the second pneumatic booster 530.

After allowing compressed air to be received in the charging part 504 of the second pneumatic booster 530 by opening the charging valves 709, 710, and 711, compressed air flows into the input part 505 of the second pneumatic booster 530 by opening the boosting valves 706, 707, and 708 in order to operate the second pneumatic booster 530. The compressed air received in the input part 505 of the second pneumatic booster 530 forms the movement of the piston 503 as the compressed air flows toward the output part of the second pneumatic booster 530, and pressurizes the received compressed air in the output part 504. In this case, the air pressure of the compressed air received in the charging lines e1, e2, and e3 and the output port line c is increased. The compressed air having the increased pressure is applied to the output port of the test object 400.

As noted above, the process for increasing the pressure of the compressed air in the input port line b and the output port line c may be performed through a control of each valve by a control unit and it is possible to simultaneously or sequentially perform pressurizations through the first pneumatic boosters 510 and 520 and the second pneumatic booster 530.

Figure 4A:
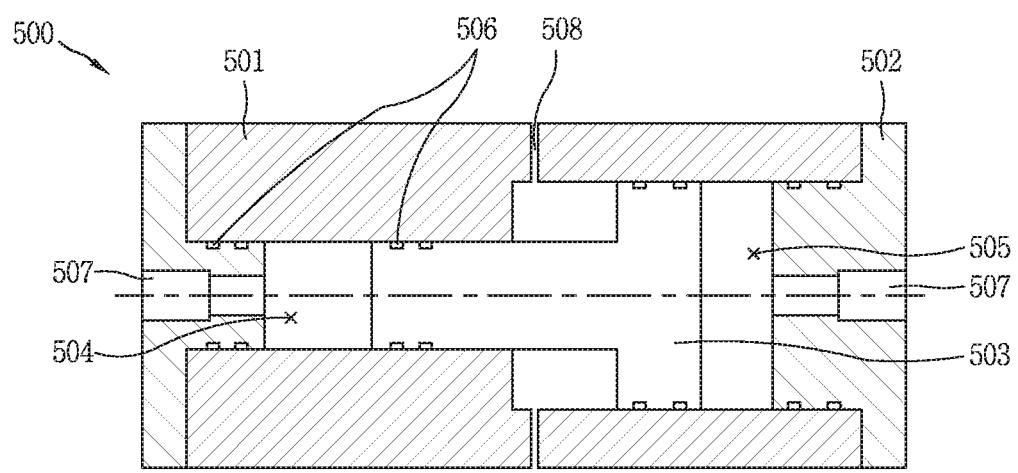
FIG. 4A is a cross-sectional view illustrating an internal structure of a pneumatic booster.
Figure 4B:
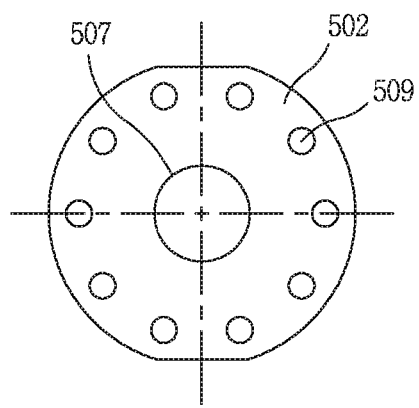
FIG. 4B is a front view illustrating a pneumatic booster when seen from the front.

FIG. 4A is a cross-sectional view illustrating an internal structure of a pneumatic booster and FIG. 4B is a view illustrating a pneumatic booster when seen from the front.

The pneumatic booster includes a cylinder 501, a piston 503, a cover 502, and an o-ring 506.

The cylinder 501 forms an enclosure and serves to receive compressed air in an internal space of the enclosure.

A compressed air discharge hole 508 serving to discharge the compressed air received in the internal space to the outside is formed at one side of the cylinder 501 as communicating the internal space and the outside. Since the airtightness maintenance by the O-ring 506 is unstable, when compressed air flows toward a space between the charging part 504 and the input part 505 of the cylinder 501, the piston 503 may move, so that the compressed air leaking through the compressed air discharge hole 508 is discharged.

The charging part 504 where compressed air is received from the charging lines e1, e2, and e3 and the input part 505 where compressed air flows from the boosting lines d1, d2, and d3 are respectively formed at the both ends of the cylinder 501.

The piston 503 reciprocates in the axial direction inside the cylinder 501 and serves to pressurize the compressed air contained in the internal space. The piston 503 has different sectional areas at both ends. Specifically, the sectional area at one end of the piston 503 facing the charging part 504 of the pneumatic booster is different from the sectional area of the piston 503 disposed at the input part 505 of the pneumatic booster. By the difference in sectional area between the both ends of the piston 503, the piston 503 may move according to the Pascal principle.

The cover 502 is coupled to each of the both ends of the cylinder 501 in order to serve to seal the internal space of the cylinder 501. As shown in FIG. 4B, the cover 502 is fixed to the cylinder 501 by bolts fastened at regular intervals with respect to the center of the cover 502.

In order to communicate the charging part 504 of the cylinder 501 and the charging lines e1, e2, and e3 and the input part 505 of the cylinder 501 and the boosting lines d1, d2, and d3, an NPT screw hole 507 is formed in the center of the cover 502.

The o-ring 506 is installed at the cover 502 and the piston 503. The o-ring 506 serves to maintain the airtightness of the pneumatic booster even at high pressures. The o-ring 506 may be provided in plurality.

As looking into an operation of the pneumatic booster, after the compressed air flowing along the charging lines e1, e2, and e3 is received in the charging part 504 of the cylinder 501, when the compressed air flowing along the boosting lines d1, d2, and d3 is flows to the input part 505 of the cylinder 501, since a sectional area at one end of the piston 503 contacting the input part 505 is greater than a sectional area at one end of the piston 503 contacting the charging part 504, the piston 503 moves toward the direction of the charging part 504 by the Pascal principle. Accordingly, as the compressed air received in the charging part 504 is pressurized and flows toward the charging lines e1, e2, and e3 and the compressed air received in the input port line b or the output port line c, which are connected to the charging lines e1, e2, and e3, is compressed, the pressure is further increased.

Since the increase amount in pressure of the compressed air obtained by using the pneumatic booster is proportional to the maximum volume of the charging part 504 and is inversely proportional to the volumes of pipes of the input port line b, the output port line c, and the charging lines e1, e2, and e3, it is desirable to increase the volume of the charging part 504 and reduce the volumes of pipes of the input port line b, the output port line c, and the charging lines e1, e2, and e3. Additionally, in order for a smooth operation of the pneumatic booster, by increasing the sectional area of the piston 503 contacting the input part 505, the compressed air received in the air storage tank 200 may be easily pushed toward the direction of the charging part 504 by using the piston 503.

According to the present invention of the above-mentioned configuration, since a high pressure is applied to a pyro device, the airtightness and performance of the pyro device may be evaluated under high pressure.

Additionally, through controls of the pneumatic booster and each of the valves, it is possible to generate relatively high pressure from low pressure safely without using expensive equipment.

Additionally, by evaluating the performance of a pyro device through a simple valve control, it is possible to efficiently perform repetitive tests necessary for evaluating the reliability of the pyro device.

As the present features may be embodied in several forms without Jo departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A performance testing device comprising:
   a compressor configured to generate compressed air;
   an air storage tank configured to receive the compressed air generated by the compressor;

a regulator connected to the compressor and the air storage tank to control a pressure of the compressed air;

a main supply line connected to the regulator to receive the compressed air from the air storage tank and to move the compressed air;

an input port line and an output port line connected to the main supply line to receive the compressed air from the air storage tank and to deliver the compressed air to an input port or an output port of a test object; and a pneumatic booster configured to pressurize the compressed air received in the input port line or the output port line, wherein in order to test a performance of the test object, the pressurized compressed air is applied to the input port or the output port of the test of object.

2. The performance testing device of claim 1, wherein the pneumatic booster comprises:

a first pneumatic booster configured to pressurize the compressed air received in the input port line; and a second pneumatic booster configured to pressurize the compressed air received in the output port line.

3. The performance testing device of claim 2, wherein the first pneumatic booster and the second pneumatic booster are formed in plurality.

4. The performance testing device of claim 2, further comprising:

a charging line connected to each of the input port line and the output port line to deliver the compressed air from the air storage tank to the pneumatic booster; and a boosting line connected to the main supply line and one end of the pneumatic boosters to deliver the compressed air from the air storage tank to the pneumatic boosters.

5. The performance testing device of claim 4, wherein the charging line comprises:

a first charging line configured to connect the input port line and another end of the first pneumatic booster to deliver the compressed air from the air storage tank to the first pneumatic booster; and a second charging line configured to connect the output port line and another end of the second pneumatic booster to deliver the compressed air from the air storage tank to the second pneumatic booster.

6. The performance testing device of claim 4, wherein the boosting line comprises:

a first boosting line configured to connect the main supply line and one end of the first pneumatic booster to deliver the compressed air from the air storage tank to the first pneumatic booster; and a second boosting line configured to connect the main supply line and one end of the second pneumatic booster to deliver the compressed air from the air storage tank to the second pneumatic booster.

7. The performance testing device of claim 4, further comprising a valve installed at each one side of the main supply line, the input port line, the output port line, the charging line, and the boosting line to control a flow of the compressed air.

8. The performance testing device of claim 7, further comprising a control unit configured to control an opening/closing of the valve.

9. The performance testing device of claim 4, wherein a pressure sensor is provided on the input port line and the output port line for measuring a pressure formed at the input port and the output port of the test object.

10. The performance testing device of claim 9, further comprising a measurement device configured to detect a signal according to a pressure measured by the pressure sensor.

11. The performance testing device of claim 4, further comprising a detonation device connected to the test object to ignite the test object.

12. The performance testing device of claim 4, wherein each of the pneumatic boosters comprises:

a cylinder configured to form an enclosure to receive the compressed air in an internal space of the enclosure;

a piston configured to reciprocate in the internal space to pressurize the compressed air; and a cover configured to cover each end of the cylinder, wherein one end of the cylinder is connected to the charging line and the other end is connected to the boosting line so that the compressed air from the storage tank flows from the boosting line to the internal space through movement of the piston.

13. The performance testing device of claim 12, wherein the piston comprises an O-ring configured to maintain an airtightness of compressed air that flows from the boosting line to the internal space.

14. The performance testing device of claim 12, wherein a compressed air discharge hole for discharging air in a space between the piston and the cylinder to the outside is formed at one side of the cylinder.

* * * * *